United States Patent
Hockley (10) Patent No.: US 8,259,972 B2
(45) Date of Patent: Sep. 4, 2012

(54) HEARING AID ADAPTED TO A SPECIFIC TYPE OF VOICE IN AN ACOUSTICAL ENVIRONMENT, A METHOD AND USE

(75) Inventor: Neil Hockley, Berne (CH)

(73) Assignee: Bernafon AG, Berne (CH)

( * ) Notice: Subject to any disclaimer, the term of this patent is extended or adjusted under 35 U.S.C. 154(b) by 864 days.

(21) Appl. No.: 12/355,633

(22) Filed: Jan. 16, 2009

(65) Prior Publication Data

US 2009/0185704 A1    Jul. 23, 2009

(30) Foreign Application Priority Data

Jan. 21, 2008 (EP) .................... 08100701

(51) Int. Cl.
H04R 25/00 (2006.01)
(52) U.S. Cl. ........................................... 381/316
(58) Field of Classification Search ............. 381/312, 381/316
See application file for complete search history.

(56) References Cited

U.S. PATENT DOCUMENTS

| | | | |
|---|---|---|---|
| 4,161,625 A | 7/1979 | Katterfeldt et al. | |
| 4,645,821 A | 2/1987 | Malinge et al. | |
| 5,457,769 A | 10/1995 | Valley | |
| 6,453,284 B1 | 9/2002 | Paschall | |
| 7,305,100 B2 | 12/2007 | Pedersen | |
| 2002/0147580 A1 | 10/2002 | Mekuria et al. | |
| 2003/0165246 A1 | 9/2003 | Kvaloy et al. | |
| 2004/0030550 A1 | 2/2004 | Liu et al. | |
| 2004/0138879 A1 | 7/2004 | Kim | |
| 2004/0190740 A1 | 9/2004 | Chalupper et al. | |
| 2005/0008176 A1 | 1/2005 | Pedersen | |
| 2005/0027537 A1 | 2/2005 | Krause et al. | |
| 2006/0179018 A1 | 8/2006 | Messmer et al. | |
| 2011/0150256 A1* | 6/2011 | Baechler et al. ............. 381/316 |

FOREIGN PATENT DOCUMENTS

| | | |
|---|---|---|
| EP | 0170590 A1 | 2/1986 |
| EP | 0821345 B1 | 9/2001 |
| EP | 1448022 A1 | 8/2004 |
| EP | 1530403 A1 | 5/2005 |
| WO | WO 03/030586 A1 | 4/2003 |
| WO | WO 2004/114722 A1 | 12/2004 |

OTHER PUBLICATIONS

European Search Report completed Apr. 3, 2008.
"Robust Formant Tracking for Continuous Speech with Speaker Variability" Kamran Mustafa et al.; Signal Processing and its Application 2003. Proceedings. Seventh International Symposium Jul. 1-4, 2003.

* cited by examiner

*Primary Examiner* — Benjamin Sandvik
*Assistant Examiner* — Whitney T Moore
(74) *Attorney, Agent, or Firm* — Buchanan Ingersoll & Rooney PC (57) ABSTRACT

A hearing aid having a microphone for converting an ambient sound signal to an electric sound signal, a voice detector adapted to determine if a voice is present in said electric sound signal and a frequency analyzer to determine a fundamental frequency of a voice present in said electric sound signal, a signal processor adapted to process said electric sound signal, or an electric signal derived from it, independent of adjustable processing parameters, a memory having corresponding sets of processing parameters and fundamental voice frequencies, a decision unit to select and forward from the memory to the signal processor a set of processing parameters in accordance with a fundamental frequency determined by the frequency analyzer. Further, a method of adapting a hearing aid and to the use of such hearing aid.

27 Claims, 8 Drawing Sheets

HEARING AID ADAPTED TO A SPECIFIC TYPE OF VOICE IN AN ACOUSTICAL ENVIRONMENT, A METHOD AND USE

PRIORITY

The present application claims priority to EP 08100701.5, filed on 21 Jan. 2008, which is herein expressly incorporated by reference.

TECHNICAL FIELD

The disclosure relates to hearing aids (HA), and deals more specifically with the problem that people with a hearing aid device may have difficulties to understand different voices, e.g. female and child voices. The disclosure furthermore relates to a method of adapting a hearing aid and to the use of such hearing aid.

Embodiments of the disclosure may e.g. be useful in hearing aids that are to be used in different social situations comprising different types of voices, e.g. in kindergartens, classrooms or auditoriums or situations involving the switching between communication with children and adults.

BACKGROUND ART

Many hearing impaired people have difficulties understanding different voices. Most amplification techniques (including generic fitting rationales) are developed around an average long term spectrum of speech (e.g. NAL NL1 (National Acoustic Laboratories, AU), DSL m[i/o] (Desired Sensation Level, The University of Western Ontario CDN), etc.) of a male voice without regards to any characteristics of the individual speaker's voice. Recorded speech tests used for the verification of the hearing aid fitting typically do not take into account any individual variations, i.e. an average is used. Anecdotally, in the clinic, the male voice is often reported by end users of hearing aids to be easier to understand than a female or a child's voice.

US 2004/0190740 describes a time and frequency dependent method of adjusting the amplification of a hearing aid to a particular speech signal in a noisy environment. The method is based on determining the levels of speech and noise signals in a plurality of frequency bands and subsequent 'automatic' adjustment of the electrical signal dependent thereon.

U.S. Pat. No. 6,453,284 describes a system for tracking individual voices in a group of voices by estimating the fundamental frequencies of each of the voices present. The system involves the use of a recurrent neural network to track the multiple voices over time. The system can e.g. be implemented in a digital hearing aid for selective amplification of an individual's voice.

EP 1 530 403 describes the definition of various groups of acoustical signals and the automatic determination of the type of acoustic signal present in a given situation and the adaptation of a corresponding fitting signal to the HA.

OBJECTS AND SUMMARY

The present disclosure deals with the problem that people with a hearing aid device may have difficulties to understand different types of voices, e.g. female and child voices.

If the hearing instrument could detect different voiced vocal patterns and then apply different dedicated settings (gain, compression and directionality, etc.) then this would aid in the perception of speech for these different voices and for the different environments where these individuals are found (e.g. a grandchild's birthday party).

An object of embodiments of the present disclosure is to seek to improve the perception of different voices in a given acoustical environment for a wearer of a hearing aid. It is a further object to seek to improve the perception of the voices of children and females, e.g. in social situations. Children can be especially difficult to understand due to the acoustics of their voices and possibly also their developing speech and language skills. Many people (especially grandparents) miss out on a lot of the thoughts and observations of their grandchildren. It is an object of the disclosure to compensate for that.

The primary idea of embodiments of the present disclosure is to detect the fundamental frequency of a voice in a given acoustical environment and to apply different settings to the hearing aid dependent thereof so as to best accommodate the perception of this voice by the wearer of the hearing aid.

A Hearing Aid

An object of the disclosure is achieved by a hearing aid comprising a microphone for converting an ambient sound signal to an electric sound signal, a voice detector adapted to determine if a voice is present in said electric sound signal and a frequency analyzer to determine a fundamental frequency of a voice present in said electric sound signal, a signal processor adapted to process said electric sound signal—or an electric signal derived from it—dependent upon adjustable processing parameters, a memory comprising corresponding sets of processing parameters and fundamental voice frequencies, a decision unit to select and forward from the memory to the signal processor a set of processing parameters in accordance with a fundamental frequency determined by the frequency analyzer. Alternatively, instead of or in addition to the fundamental frequency, one or more formant frequencies can be used to define the type of voice.

This has the advantage of allowing a modification of parameters of a hearing aid program for a signal processing unit for adapting an electrical sound signal to a specific hearing profile and acoustic environment to be modified according to the type of voice present in the actual acoustic environment and to thereby optimize the perception of that voice for the wearer of the hearing aid.

The term 'a set of processing parameters for processing the electrical sound signal' is to be understood as comprising at least one parameter, e.g. a parameter of a program of a digital signal processor for processing an input signal comprising a signal originating from an acousto-electric transducer (e.g. a microphone) to adapt the signal to a specific hearing profile and/or acoustic environment (e.g. a parameter influencing the amplification in a particular frequency band/range, or a set of parameters defining a part of or a full gain profile, compression, noise reduction, directionality, etc.). The term 'a set of processing parameters' may alternatively cover a piece of program code or an algorithm of a hearing aid program.

The terms 'hearing aid' and 'hearing instrument' are used interchangeably in the present application to indicate a listening device that is adapted to provide a (e.g. customized) frequency dependent gain of an input sound signal to improve a listeners perception of the input sound.

Figure 5:
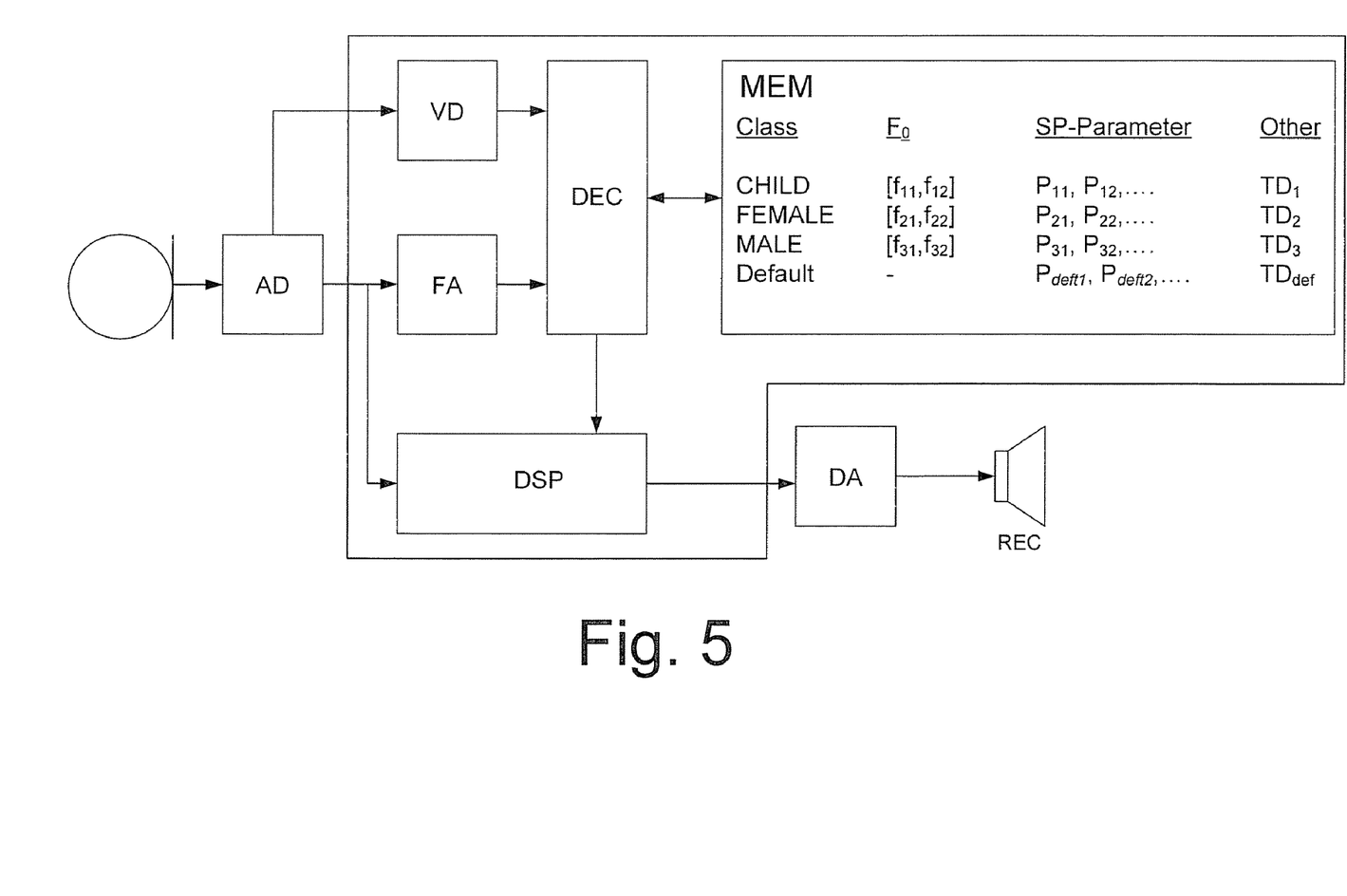
FIG. 5 shows a partial block diagram of a hearing aid according to an embodiment of the disclosure.

In an embodiment, a number of the parameters of a hearing aid program can be modified during the normal course of that hearing aid program. In an embodiment, the hearing instrument is adapted to have different gain tables assigned within a single program. This makes the adaptation more smooth and less noticeable for the end-user, because it is NOT necessary to stop the current program and load a new program to the signal processor from a non-volatile memory of the hearing instrument. In an embodiment, a specific CHILD-gain map, optimized to a voice from a child, and a specific FEMALE-gain map, optimized to a voice from a female, can be automatically selected for a program adapted for a specific acoustic environment or situation (e.g. with other voices present in the background, discussion with no other voices present (other than the discussion partner(s)), etc.). This has the advantage that a user does not have to change the current program because the necessary modification can occur automatically within the framework of the current program. In the present context, the term 'program' is intended to cover the settings of a hearing aid (e.g. gain, compression, directionality, noise reduction, frequency transposition, etc.), which can be adjusted to particular hearing situations (e.g. TV-watching, conversation, work, party, etc.) and the change of which typically involve reloading of software from a non-volatile memory to the working memory of the signal processor. In other words, the focus on a specific 'type' of person (e.g. male, female or child) within a given acoustic environment can in a particular embodiment advantageously be handled within the same program. With reference to FIG. 5, the lookup table containing corresponding values of fundamental and/or formant frequencies and processing parameters for the signal processor are stored in a memory (MEM), from which they can be loaded into the signal processor (DSP) and replace the current values, without reloading the whole program. In this embodiment, only the predefined parameters, which depend on the fundamental frequency, are occasionally changed by loading the currently appropriate parameters from the memory (MEM) to the signal processor, whereas the rest of the parameters for the current program are left unaltered (in the processor). In an embodiment, parameters for a given hearing aid program p(x), e.g. for face to face (f2f) conversation, p(f2f), comprises a number Q of parameters, $P_{f2f1}, P_{f2f2}, \ldots, P_{f2fq}, P_{f2fq+1}, \ldots, P_{f2f2q}, P_{f2f2q+1}, \ldots, P_{f2f3q}, P_{f2f3q+1}, \ldots, P_{f2fQ}$, where the first 3q parameters depend on the fundamental frequency $F_0$ of the voice being listened to and comprise three sets of q parameters, each being optimized to a different range of fundamental frequencies (e.g. for listening to a MALE ($P_{f2f1}, P_{f2f2}, \ldots, P_{f2fq}$), FEMALE ($P_{f2fq+1}, \ldots, P_{f2f2q}$), and CHILD ($P_{f2f2q+1}, \ldots, P_{f2f3q}$) voice, respectively), and of which only one set is used in the processor at a time. A signal from the frequency analyzer can—dependent upon the actually determined fundamental frequency—decide which of the three sets of parameters are to be used at a given time. The change between the three sets of parameters, which are stored in a rapidly accessible memory (e.g. a RAM or cache memory or other dynamic memory, cf. e.g. MEM in FIG. 5) of the hearing aid (e.g. the signal processor), can be performed in a shorter time than if a whole new program with totally new parameters ($P_{x1}$-$P_{xQ}$, x designating a specific listening situation for which a separate program exists) should be read into the signal processor from a memory (e.g. a non-volatile memory, e.g. an EPROM or other permanent memory) with a slower access time. Typically, the number q of parameters ($P_{x1}, \ldots, P_{x3q}$), which can be easily exchanged, is smaller (e.g. q in range from 1 to 5 or in the range from 5 to 20) than the number Q-3q of parameters ($P_{x3q+1}, \ldots, P_{xQ}$), which are independent of the fundamental frequency (e.g. Q-3q in the range from 20 to 100 or in the range from 50 to 200 or more). In an embodiment, the ratio of Q to n*q, where n is the number of sets of parameters depending on the fundamental frequency that can be easily exchanged (above, n=3), is larger than 1, such as larger than 2, such as larger than 5, such as larger than 10. In an embodiment, the sets of q parameters that are adapted to be rapidly exchanged in the processor represent different gain profiles each optimized e.g. for a MALE, a FEMALE or a CHILD speaker).

The primary information that is intended to be detected by the frequency analyzer is the fundamental frequency of an individual's vocalizations. The meaning of the term 'fundamental frequency' ($F_0$) is understood to follow its established definition in speech acoustics. This is the smallest frequency at which the vocal folds vibrate. Higher harmonics ($n*F_0$) of the fundamental frequency are typically also produced (n=2, 3, 4, . . . ). The frequencies, at which the vocal tract resonates, are called the formant frequencies $F_i$, i=1, 2, 3, . . . (cf. e.g. Yost, W. A. & Nielsen, D. W. (1985), Fundamentals of Hearing, Holt, Reinhart, & Winston New York N.Y., page 190). The formant frequencies are produced by the fundamental frequency and/or those higher harmonics thereof, whose frequency are close to a resonance frequency of the vocal tract. The formants provide information by which we are able to perceive the differences between vocalized speech sounds, e.g. vowels. If the fundamental frequency is known, characteristics of a vocalization can be predicted. The formant frequencies are determined by the size, length and shape and the ends of the vocal tract. Because the dimensions of the vocal tract differ from person to person, the formant frequencies vary correspondingly. For example, the average length of the vocal tract of a male is about twice that of a child and 1.2 times that of a female. This leads to generally higher child and female formant frequencies than those of a male.

In a particular embodiment, the frequency range of interest $\Delta f$ considered by the hearing aid is e.g. between 5 Hz and 20 kHz, such as between 10 Hz and 10 kHz. In an embodiment, the frequency range of interest is split into a number of frequency bands $FB_i$ (i=1, 2, . . . , $n_b$), e.g. $n_b$=8 or 16 or 64 or more (where each band may be individually processed). In an embodiment, the listening system comprises a filter bank splitting the electrical input signal into a number of signals, each comprising a particular frequency band $FB_i$ (i=1, 2, . . . , $n_b$), where $n_b$ can be any relevant number larger than 1, e.g. $2^n$, where n is an integer $\geq 1$, e.g. 6.

In a particular embodiment, the decision circuit provides a control signal adapted to select a set of processing parameters dependent upon the determined fundamental frequency.

In a particular embodiment, the decision unit—dependent upon the control signal—is adapted to forward the selected set of processing parameters to the signal processor with a predetermined time delay TD. This has the advantage of enabling an individualized change from one parameter set (e.g. gain profile) to another.

In a particular embodiment, the decision unit is adapted to provide that the time delay TD is dependent on the detected fundamental frequency $F_0$. In other words, an algorithm or formula for allocating a time delay to a specific fundamental frequency is provided.

In a particular embodiment, the decision unit is adapted to provide that a predefined set of default parameters are loaded after a predetermined time delay in case no voice is present. This has the advantage that the hearing aid can be automatically adapted to a situation of 'silence' in case it has previously been adapted to a specific type of voice or speaker.

A voice detector is a unit that detects whether a voice is present in an acoustic input signal and outputs a corresponding control signal. In an embodiment, the voice detector analyzes the electric (possibly digitized) representation of an acoustic input signal, e.g. the electrical input signal as provided by a microphone having converted the acoustical input signal to an electrical input signal. One of the characteristics of voiced speech is the presence of a series of harmonic frequencies. A simple voice detector detects the possible presence of synchronous energy and harmonic structures of vowels in the ambient sound signal (when converted to an (possibly digitized) electric sound signal). The control signal (voice OR no voice) from the voice detector can in its simplest form be used to switch from a 'speech'-mode (initializing a hearing aid program optimized for speech understanding) to a non-speech or comfort mode (initializing a hearing aid program optimized for comfortable listening) of the hearing aid.

In a particular embodiment, the voice detector is adapted to operate with a predefined VD-update frequency. In an embodiment, the voice detector is updated at least every 10 s, such as at least every 5 s, such as at least every 1 s, such as at least every 0.5 s. Preferably a compromise is made between speed of adaptation (relatively high update frequency) and stability (relatively low update frequency to avoid unintentional updates due to short temporary changes in the acoustic environment).

A frequency analyzer is a unit that determines a fundamental frequency of an electrical signal comprising a voice. Various fundamental aspects of frequency analyzers are discussed in A. M. Noll, Short-Time Spectrum and "Cepstrum" Techniques for Vocal-Pitch Detection, The Journal of the Acoustical Society of America, Volume 36, Number 2, February 1964 and in A. M. Noll, Cepstrum Pitch Determination, The Journal of the Acoustical Society of America, Volume 41 Number 2, 1967.

In an embodiment, the frequency analyzer is controlled by a voice detector. In an embodiment, the frequency analyzer is activated by a detection of a voice by the voice detector.

In a particular embodiment, the frequency analyzer is adapted to operate with a predefined FA-update frequency. In an embodiment, the frequency analyzer is updated only when a voice is present (e.g. as indicated by the voice detector). In an embodiment, the frequency analyzer is updated with a frequency equivalent to that of the voice detector. In an embodiment, the frequency analyzer is updated more often than once every 10 s, such as more often than once every 1 s.

In a particular embodiment, the voice detector is adapted to determine a dominant voice among a multitude of voices.

The term 'a dominant voice' is in the present context taken to mean the loudest voice, e.g. determined by direct measurement of the sound pressure level of the speech signals in an environment.

In a particular embodiment, the dominant voice is determined on the basis of average sound level pressure (in a predefined frequency range, e.g. in one or more selected frequency bands, e.g. in all bands).

In an embodiment, the 'voice detector' and the 'frequency analyzer to determine a fundamental frequency of a voice' are integrated into the same functional unit.

In a particular embodiment, the corresponding sets of processing parameters and fundamental voice frequencies include sets of processing parameters corresponding to predefined average fundamental frequencies for male, female and child voices. Relevant ranges of average fundamental frequencies for the actual voice types can e.g. be determined by experiment.

In an embodiment, the average male fundamental frequency is defined in the range from $f_{11}$ to $f_{12}$. In an embodiment, $f_{11}$ is larger than or equal to 85 Hz. In an embodiment, $f_{12}$ is smaller than or equal to 165 Hz. In an embodiment, the average male fundamental frequency is defined in the range from 85 Hz to 165 Hz.

In an embodiment, the average female fundamental frequency is defined in the range from $f_{21}$ to $f_{22}$. In an embodiment, $f_{21}$ is larger than or equal to 165 Hz. In an embodiment, $f_{22}$ is smaller than or equal to 240 Hz. In an embodiment, the average female fundamental frequency is defined in the range from 165 Hz to 240 Hz.

In an embodiment, the average child fundamental frequency is defined in the range from $f_{31}$ to $f_{32}$. In an embodiment, $f_{31}$ is larger than or equal to 240 Hz. In an embodiment, $f_{32}$ is smaller than or equal to 540 Hz. In an embodiment, the average child fundamental frequency is defined in the range from 240 Hz to 540 Hz.

In an embodiment, a default set of parameters (e.g. equal to parameters for a specific group or a dedicated DEFAULT set) is used if the fundamental frequency determined is not within the ranges of the predefined groups, or if no well defined fundamental frequency can be determined. Such set of parameters can e.g. be loaded after a predefined time delay $TD_{DEFAULT}$ after the loss of a 'valid' fundamental frequency (e.g. depending on the update frequency (VD-update) of the voice detector, e.g. a predefined number of $T_{UPDATE}$ (the time between subsequent updates), e.g. 2 or 5 or 10 times $T_{UPDATE}$, or e.g. after a predefined time, e.g. 10 s or 20 s or 30 s.

It is intended that the features of the method of adapting a hearing aid described below (in the detailed description and in the claims) for a hearing aid can be combined with the hearing aid outlined above (when appropriately defined as structural features).

A Method of Adapting a Hearing Aid

It is intended that some or all of the features described above, in the detailed description, or in the appended claims for a hearing aid can be combined with embodiments of the method outlined in the following.

A method of adapting a hearing aid to a voice in an acoustical environment is furthermore provided, the method comprising a) converting an acoustical sound signal into an electrical sound signal;

b) determining whether a voice is present in said electric sound signal;

c) determining the fundamental frequency of the electrical sound signal, if a voice signal is present;

d) classifying the voice based on the determined fundamental frequency and a predefined set of fundamental voice frequencies;

e) selecting a set of parameters for processing the electrical sound signal based on the determined voice class and predetermined corresponding sets of processing parameters and voice classes; and f) forwarding the selected set of processing parameters to a signal processor for processing the electrical sound signal—or a signal derived from it—and generating a processed signal In an embodiment, at least some of the predefined sets of fundamental voice frequencies include overlapping neighboring frequency ranges.

In an embodiment, a predefined set of processing parameters comprises at least one parameter for modifying gain, compression, and/or directionality, etc. to improve the perception of speech for the wearer of the hearing aid.

In an embodiment, the corresponding sets of processing parameters and fundamental voice frequencies defining different voice classes include sets of processing parameters corresponding to predefined ranges of average fundamental frequencies for male, female and child voices. In an embodiment, the relevant ranges of average fundamental frequencies for the voice types in question are determined by experiment.

In an embodiment, the average male fundamental frequency is defined in the range from $f_{11}$ to $f_{12}$. In an embodiment, $f_{11}$ is larger than or equal to 85 Hz. In an embodiment, $f_{12}$ is smaller than or equal to 155 Hz. In an embodiment, the average male fundamental frequency is defined in the range from 85 Hz to 155 Hz.

In an embodiment, the average female fundamental frequency is defined in the range from $f_{21}$ to $f_{22}$. In an embodiment, $f_{21}$ is larger than or equal to 165 Hz. In an embodiment, $f_{22}$ is smaller than or equal to 255 Hz. In an embodiment, the average female fundamental frequency is defined in the range from 165 Hz to 255 Hz.

In an embodiment, the average child fundamental frequency is defined in the range from $f_{31}$ to $f_{32}$. In an embodiment, $f_{31}$ is larger than or equal to 250 Hz. In an embodiment, $f_{32}$ is smaller than or equal to 540 Hz. In an embodiment, the average child fundamental frequency is defined in the range from 250 Hz to 540 Hz.

In an embodiment, if the dominant voice is classified as a child's voice, the corresponding set of processing parameters comprise at least one parameter for automatically switching the hearing aid into full directional mode, and/or for applying more gain at relatively higher frequencies for relatively soft to medium input levels, and/or for increasing noise reduction.

In an embodiment, the method further comprises a learning mode defining different classes i (i=1, 2, ..., n) of voices and corresponding fundamental frequency ranges $[f_{i1};f_{i2}]$. In an embodiment, the fundamental frequency ranges corresponding to different classes of voices are adapted to individual voice types, e.g. the voices of a person's family or of persons frequently engaged, e.g. in a working environment. This training aimed at automatic program selection can e.g. be implemented using a neural network based on a self organising map, cf. e.g. US 2006/0179018.

In a particular embodiment, a total set of processing parameters for a specific hearing aid program comprises a total number Q of parameters, including a number n*q of parameters that depend on the fundamental frequency of the input signal and a number Q-n*q parameters that are independent thereof and wherein the n*q parameters represent n subsets of q parameters each being optimized for a particular one of n possible voice classes, so that only Q-(n-1)*q parameters are used in the signal processor at a given time for a specific hearing aid program.

In a particular embodiment, a subset of q parameters out of the n*q parameters can be exchanged in the total set of Q-(n-1)*q parameters currently being processed by the signal processor without reloading all Q-(n-1)*q parameters. This has the advantage that the HA-program can be automatically adapted to a particular type of voice (selected among a number of predefined types of voices) without having to reload the whole program (e.g. all parameters necessary for characterizing the program).

In an embodiment, the number of class types n is 2 (e.g. ADULT, CHILD) or 3 (e.g. ADULT, CHILD, OTHER or MALE, FEMALE, CHILD) or 4 (e.g. MALE, FEMALE, CHILD, OTHER).

In a particular embodiment, at least some of the q parameters govern or influence the gain in at least a part of the frequency range of interest (a number of frequency bands), e.g. corresponding to the relatively higher frequencies, e.g. frequencies within the frequency range of interest larger than a low-to-high frequency f(L->H). In an embodiment, f(L->H) is around 1,000 Hz or around 1,500 Hz or around 2,000 Hz or around 2,500 Hz or around 4,000 Hz. In a particular embodiment, at least some of the q parameters govern or influence gain and/or directionality and/or compression and/or noise reduction.

Use of a Hearing Aid

Use of embodiments of a hearing aid as described above, in the detailed description or in the appended claims or obtainable by embodiments of a method as described above, in the detailed description or in the appended claims is furthermore provided.

A Software Program and a Computer Readable Medium:

A software program for running on a digital signal processor of a hearing aid comprising a signal processor is furthermore provided, the software program, when executed on the digital signal processor, implementing at least some of the steps of the method described above, in the detailed description and in the claims. Preferably at least one of steps b) to f) of the method is implemented in the software program. In an embodiment, the hearing aid is a hearing aid as described above, in the detailed description and in the claims.

A medium having instructions stored thereon is furthermore provided. The stored instructions, when executed, cause a signal processor of embodiments of a hearing aid as described above, in the detailed description or in the appended claims to perform at least some of the steps of the method as described above, in the detailed description and in the claims. Preferably at least one of steps b) to f) of the method is included in the instructions. In an embodiment, the medium comprises a non-volatile memory of a hearing aid. In an embodiment, the medium comprises a volatile memory of a hearing aid.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present. Furthermore, "connected" or "coupled" as used herein may include wirelessly connected or coupled. As used herein, the term "and/or" includes any and all combinations of one or more of the associated listed items.

BRIEF DESCRIPTION OF DRAWINGS

The disclosure will be explained more fully below in connection with a preferred embodiment and with reference to the drawings in which:

FIG. 1 schematically shows basic components of a hearing aid, FIG. 1a illustrating the forward path and an acoustical feedback path, FIG. 1b illustrating an embodiment additionally comprising an electrical feedback cancellation path, FIG. 2 schematically shows a processing unit according to an embodiment of the disclosure comprising functional blocks for determining the class of a voice and for adapting the signal processing accordingly, FIG. 3 shows a processing unit according to a specific embodiment of the disclosure, FIG. 4 schematically shows an example of a frequency spectrum of a vowel spoken by a particular person with particular vocal folds (decisive for fundamental frequency $F_0$) and vocal tract (decisive for formant frequencies $F_1$, $F_2$, $F_3$), FIG. 6 shows in FIG. 6a an example of a hearing loss profile for a hearing impaired person and in FIG. 6b corresponding gain profiles optimized to a CHILD, a FEMALE and a MALE voice.

The figures are schematic and simplified for clarity, and they just show details which are essential to the understanding of the disclosure, while other details are left out.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

DETAILED DESCRIPTION OF PREFERRED EMBODIMENTS

FIG. 1 shows basic components of a hearing aid 100.

Figure 1A:
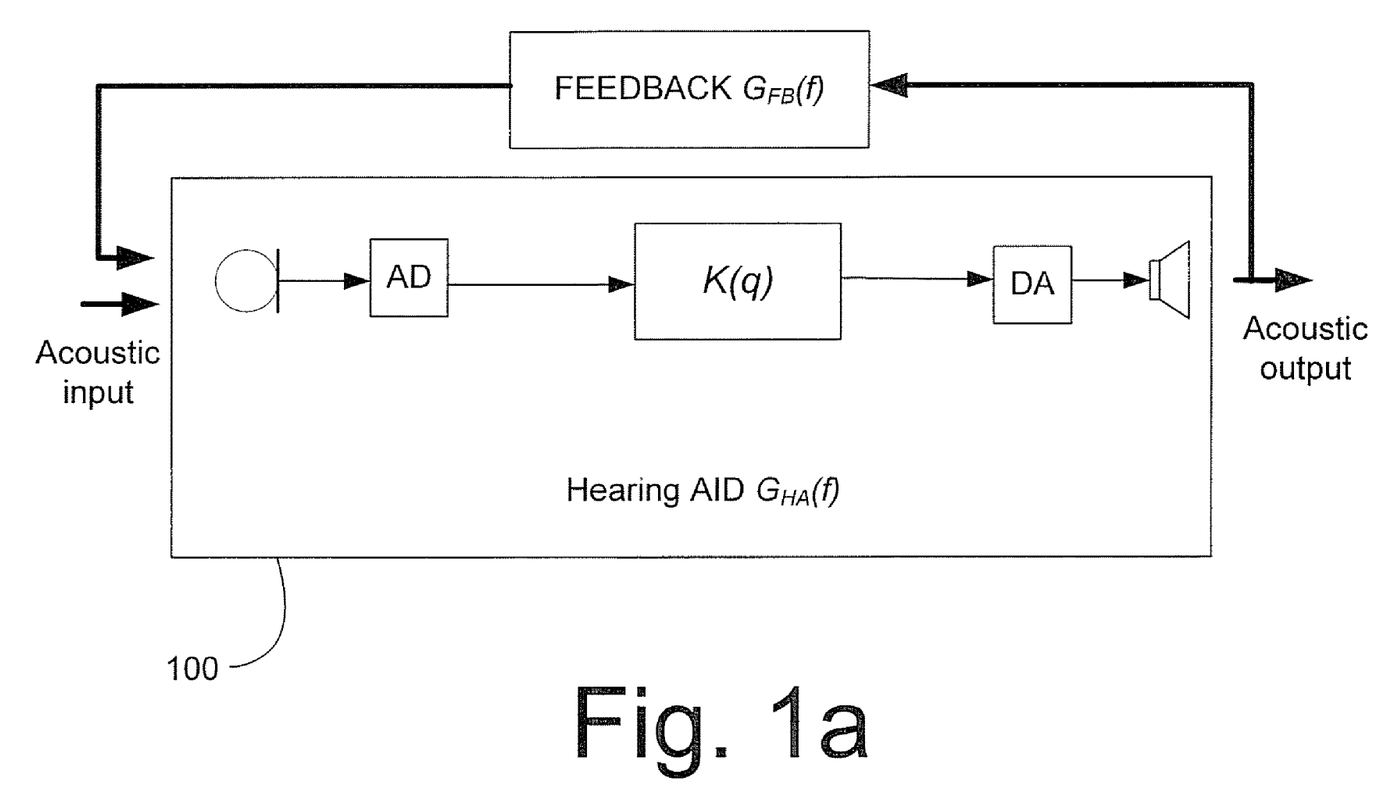

FIG. 1a illustrates the forward path and an (unintentional) acoustical feedback path. The forward path comprises an input transducer (here a microphone) for receiving an acoustic input from the environment, an AD-converter, a digital processing part K(q) for adapting the signal to the needs of a wearer of the hearing aid, a DA-converter and an output transducer (here a receiver) for generating an acoustic output to the wearer of the hearing aid. The intentional forward or signal path and the components of the hearing aid are enclosed by the dashed outline denoted 100. An (external, unintentional) acoustical feedback path $G_{FB}(f)$ from the output transducer to the input transducer is indicated.

Figure 1B:
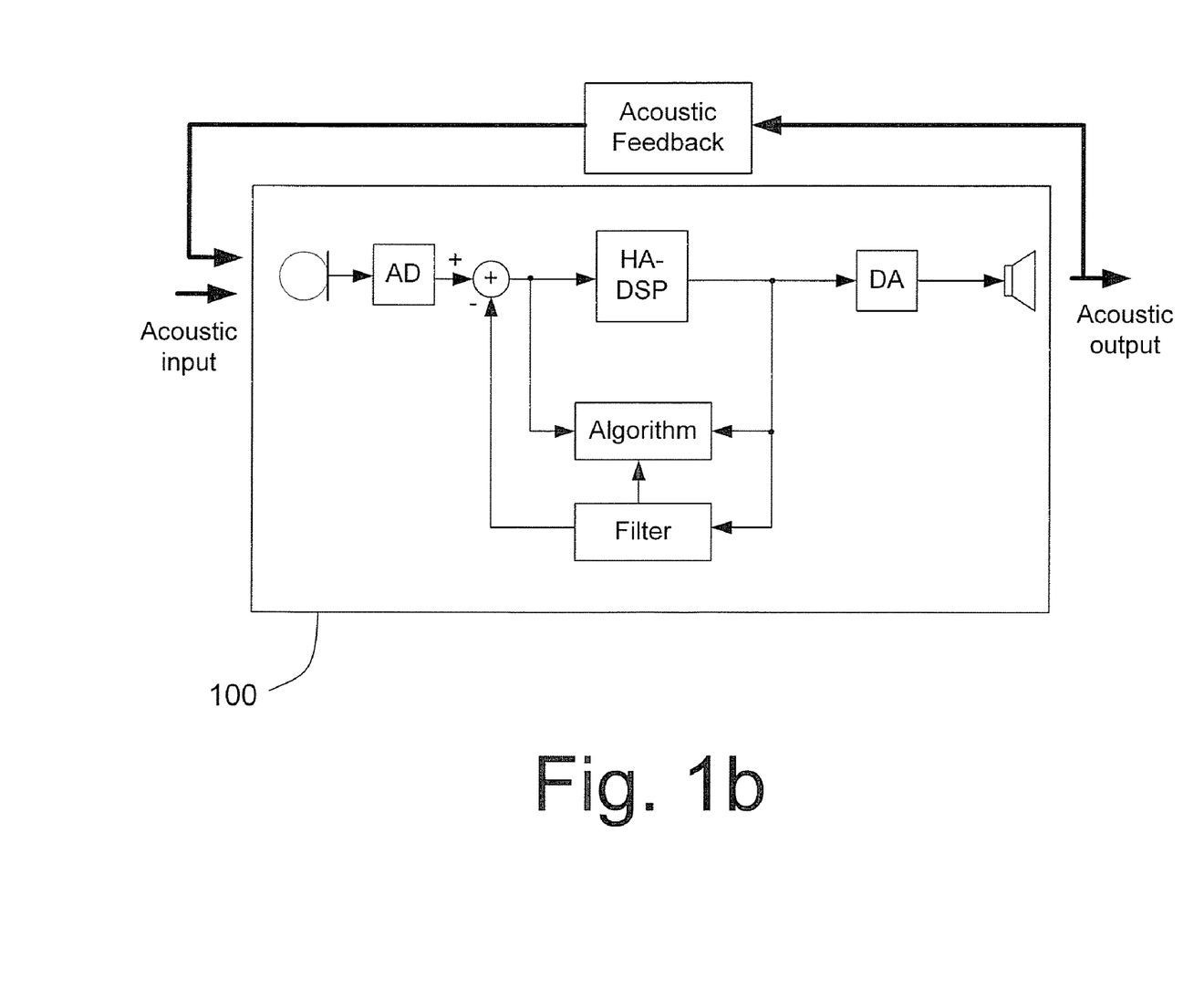

FIG. 1b illustrates a hearing aid as in FIG. 1a, additionally comprising an electrical feedback cancellation path for reducing or cancelling acoustic feedback from an 'external' feedback path from output to input transducer of the hearing aid. Here the electrical feedback cancellation path comprises an adaptive filter, which is controlled by a prediction error algorithm, e.g. an LMS (Least Means Squared) algorithm, in order to predict and cancel the part of the microphone signal that is caused by feedback from the receiver of the hearing aid. The adaptive filter (in FIG. 1b comprising a 'Filter' part and a prediction error 'Algorithm' part) is aimed at providing a good estimate of the external feedback path from the DA to the AD. The prediction error algorithm uses (in the shown embodiment) a reference signal (here the output signal from the signal processor) together with an error signal in the form of the (feedback corrected) microphone signal to find the setting of the adaptive filter that minimizes the prediction error when the reference signal is applied to the adaptive filter. The forward path (alternatively termed 'signal path') of the hearing aid comprises signal processing (termed 'HA-DSP' in FIG. 1b) to adjust the signal (incl. gain) to the impaired hearing of the user.

The functional parts of embodiments of the present disclosure preferably form part of the forward path and can e.g. be an integral part of the processing unit (HA-DSP in FIG. 1b). Alternatively, they may be implemented partially or fully separate there from.

Figure 2:
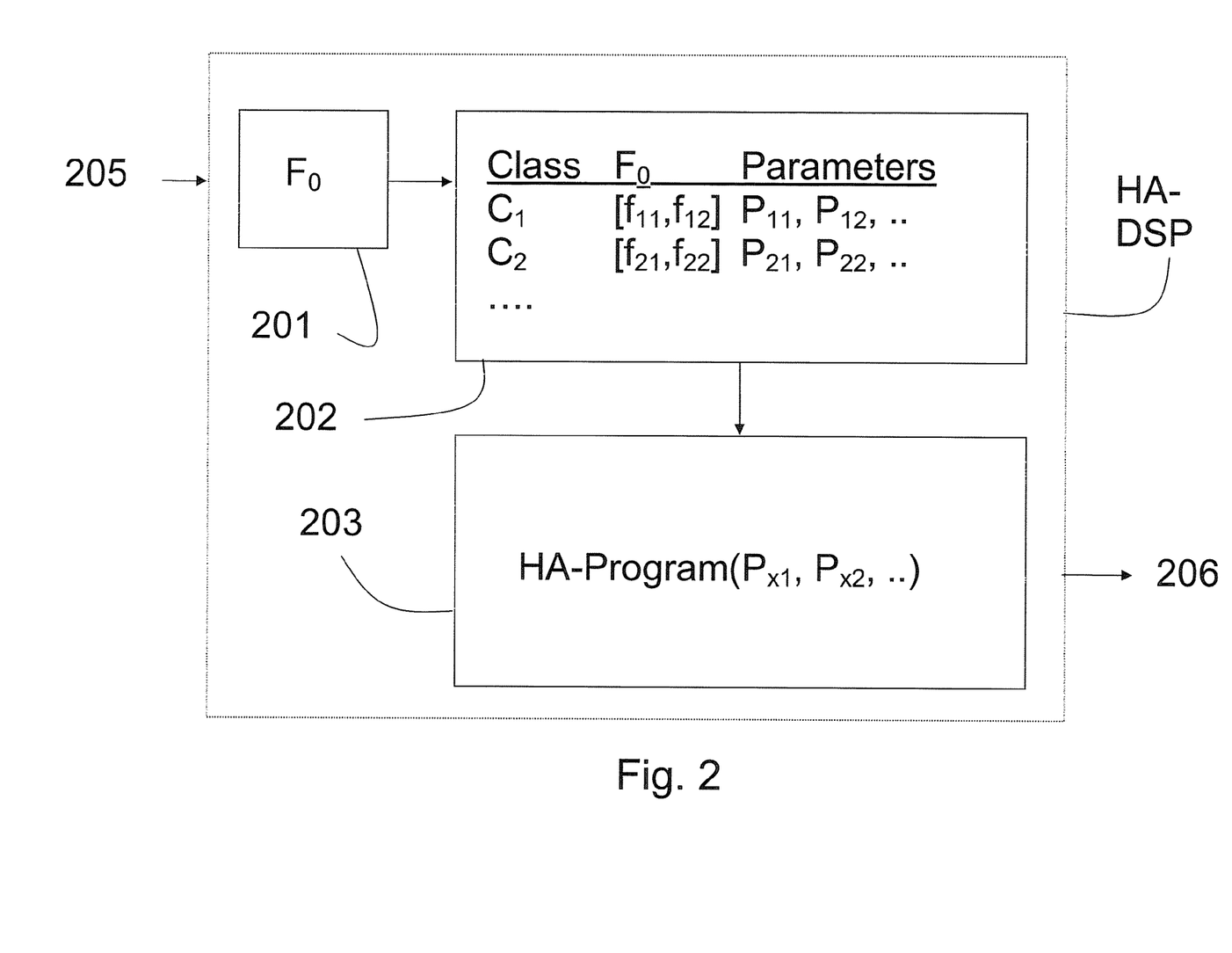

FIG. 2 shows a processing unit (HA-DSP) according to an embodiment of the disclosure comprising functional blocks 201, 202, 203 for determining the fundamental frequency (201), the class of a voice and corresponding signal processing parameters (202) corresponding thereto and for adapting the signal processing accordingly (203). Digital input and output signals to and from the processing unit HA-DSP are denoted 205 and 206, respectively.

The fundamental frequency $F_0$ of the electrical input signal 205 is e.g. determined by a frequency analyzing unit 201. The frequency analyzing unit may comprise a voice detector.

Predetermined, corresponding values of voice classes $C_i$, frequency ranges $[f_{i1}, f_{i2}]$ of the fundamental frequency $F_0$ ($f_{i1} \leq F_0 \leq f_{i2}$) and processing parameters $P_{i1}, P_{i2}, \ldots, P_{iN}$ for shaping the output signal to the needs of the wearer of the hearing aid (for a particular acoustic environment) are stored in a memory of a HA parameter selector 202.

| Class | $F_0$ | Parameters |
|---|---|---|
| $C_1$ | $[f_{11}, f_{12}]$ | $P_{11}, P_{12}, \ldots, P_{1N}$ |
| $C_2$ | $[f_{21}, f_{22}]$ | $P_{21}, P_{22}, \ldots, P_{2N}$ |
| ... | ... | ... |
| $C_i$ | $[f_{i1}, f_{i2}]$ | $P_{i1}, P_{i2}, \ldots, P_{iN}$ |
| ... | ... | ... |
| $C_n$ | $[f_{n1}, f_{n2}]$ | $P_{n1}, P_{n2}, \ldots, P_{nN}$ |

The frequency ranges may be overlapping or preferably distinct (non-overlapping).

In an embodiment, for two neighbouring frequency ranges (range i and i+1, corresponding to classes $C_i$ and $C_{i+1}$, respectively), the high end value $f_{i2}$ of the lower frequency range is equal to the low end value $f_{(i+1)1}$ of the higher frequency range (e.g. $f_{12}$ of $C_1 = f_{21}$ of $C_2$).

Different voice classes $C_i$ typically have different processing parameters $P_{i1}, P_{i2}, \ldots, P_{iN}$. The processing parameters influence one or more HA-functional parameters, e.g. gain, compression, directionality, noise reduction, etc. The influence of given processing parameters on a given functional parameter may e.g. be different in different frequency ranges or at different sound levels. The gain may for a given voice class (in a given acoustic environment, i.e. for a given processing parameter set) e.g. be increased at higher frequencies and kept constant at lower frequencies compared to that of another voice class or alternatively be decreased at higher sound levels and increased at lower sound levels, etc.

The selected parameters corresponding to the identified voice class are used in the signal processing part 203 to adapt the signal to provide an output that is specifically adapted to improve the perception of that voice class to the wearer of the hearing aid.

The N parameters ($P_{i1}, P_{i2}, \ldots, P_{iN}$) of a given class $C_i$ may in an embodiment represent a subset of the total set of parameters that constitute a hearing aid program. In an embodiment, the hearing aid is adapted to provide that these subsets of parameters can be exchanged without reloading the other parameters (i.e. so that the N parameters corresponding to a class $C_p$ can be substituted by the N parameters corresponding to a class $C_r$) and thus provide a seamless adaptation to a change of the acoustic environment from one voice class (e.g. a male) to another voice class (e.g. a child). This can be achieved by storing the N parameters of the n voice classes in a (e.g. volatile) memory with a relatively low access time from which a relevant subset of parameters can be selected and loaded into the signal processing unit.

Figure 3:
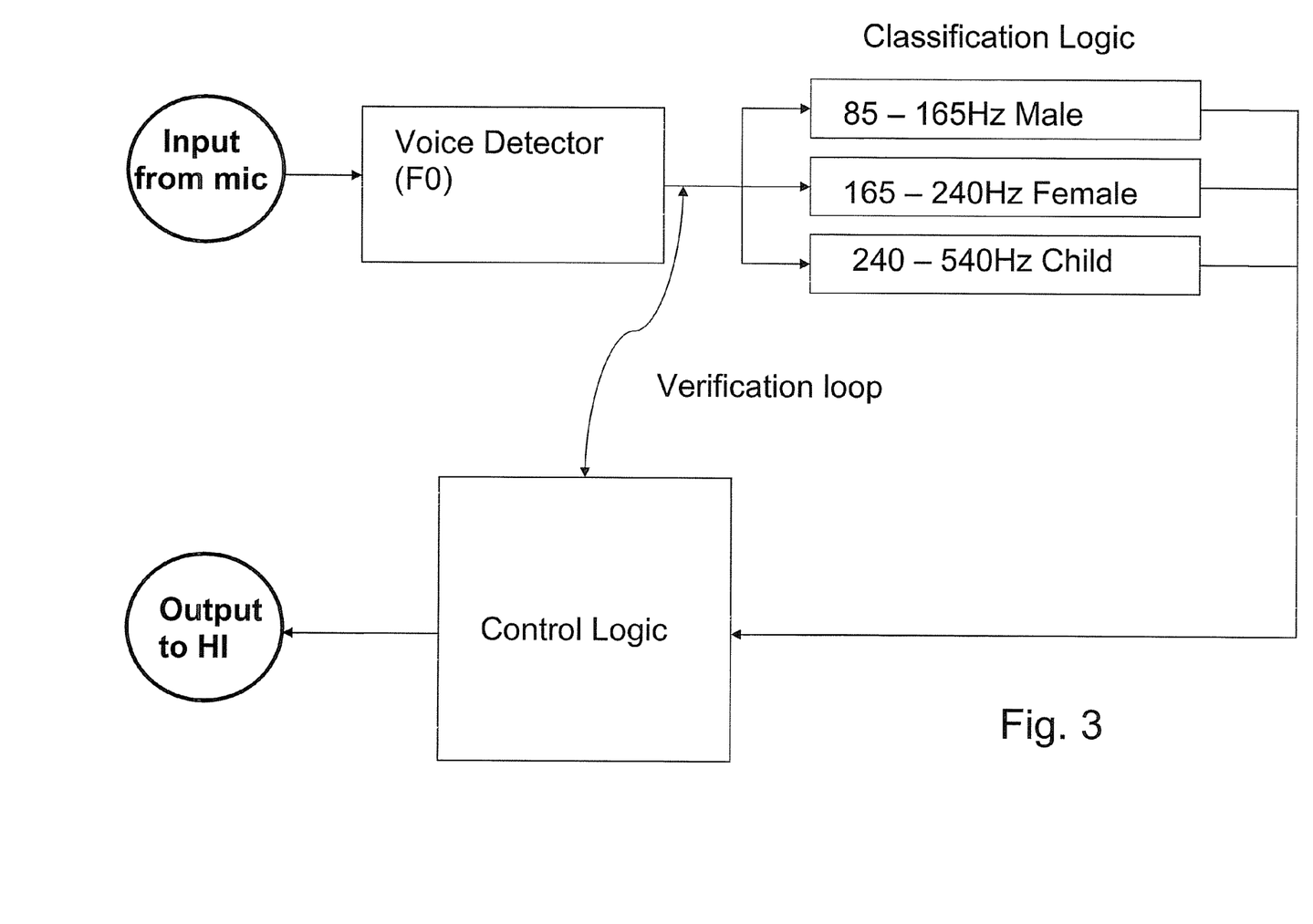

FIG. 3 shows a processing unit according to a specific embodiment of the disclosure illustrating an embodiment of the verification loop for classifying the type of voice and the selection of an appropriate corresponding set of parameters for the signal processor.

The objective of the system is to detect the fundamental frequency of the dominant voice in the auditory environment that the hearing aid user is currently part of and to influence the selection of processing parameters or hearing aid program to be used dependent upon the determined fundamental frequency. FIG. 3 shows the (digitized) electric sound signal from a microphone of the hearing aid as an input (Input from mic) to a voice detector (Voice Detector (F0), including a frequency detector for detecting a fundamental frequency $F_0$ of a voice in the signal). A detected voice is in the Classification Logic e.g. classified as being a male, a female or a child's voice using the frequency ranges illustrated in the boxes of the Classification Logic in FIG. 3 (or as taken from other sources or determined experimentally). The resulting decision is taken in the Control Logic block, based on the determination of the Fundamental Frequency of the voice and the stored frequency ranges. A control signal or the processing parameters corresponding to the detected voice (Output to HI) is sent to the amplification and processing part of the hearing instrument (e.g. block 203 in FIG. 2 or block DSP in FIG. 5) to make predefined changes (according to a predefined scheme) of one or more parameters of the hearing instrument in order for the dominant voice to be more audible to the user. For example, if a child's voice is detected, then the system may automatically switch into full directional mode, more gain may be applied at higher frequencies for soft to medium input levels, and noise reduction may be increased. The maximum power output (MPO) may be reduced, if the hearing instrument user, who has loudness tolerance problems, is commonly in environments with many children e.g. a classroom. The system may be adapted to be self regulating and/or continuously be updated (e.g. at a predefined or selectable update frequency) to ensure that the correct settings are applied in a seamless way depending upon the voices that are currently detected. Such verification may be performed with a predefined verification frequency, e.g. every 0.1 second, every second or every 5 or 10 seconds.

In an embodiment, the classification of a (dominant) voice is performed according to the following scheme showing voice class vs. fundamental frequency ranges.

TABLE 1

Average fundamental frequency ranges [$f_1$, $f_2$].

| $C_i$ | Class-type | $f_{i1}$-$f_{i2}$ |
|---|---|---|
| $C_1$ | Average Male Fundamental Frequency | 85-165 Hz |
| $C_2$ | Average Female Fundamental Frequency | 165-240 Hz |
| $C_3$ | Average Child Fundamental Frequency | 240-540 Hz |

These acoustic characteristics are universal and are not substantially language dependant. They create 3 categories, which makes the classification process easier.

In a specific practical situation, the frequency ranges [$f_{i1}$, $f_{i2}$] for the relevant classes $C_i$ can be determined by experiment, possibly based on measured average values (possibly for a particular language and/or country and/or race) or additionally or alternatively customized to a particular user by measurement on persons frequently engaged by the user of the hearing aid.

Figure 4:
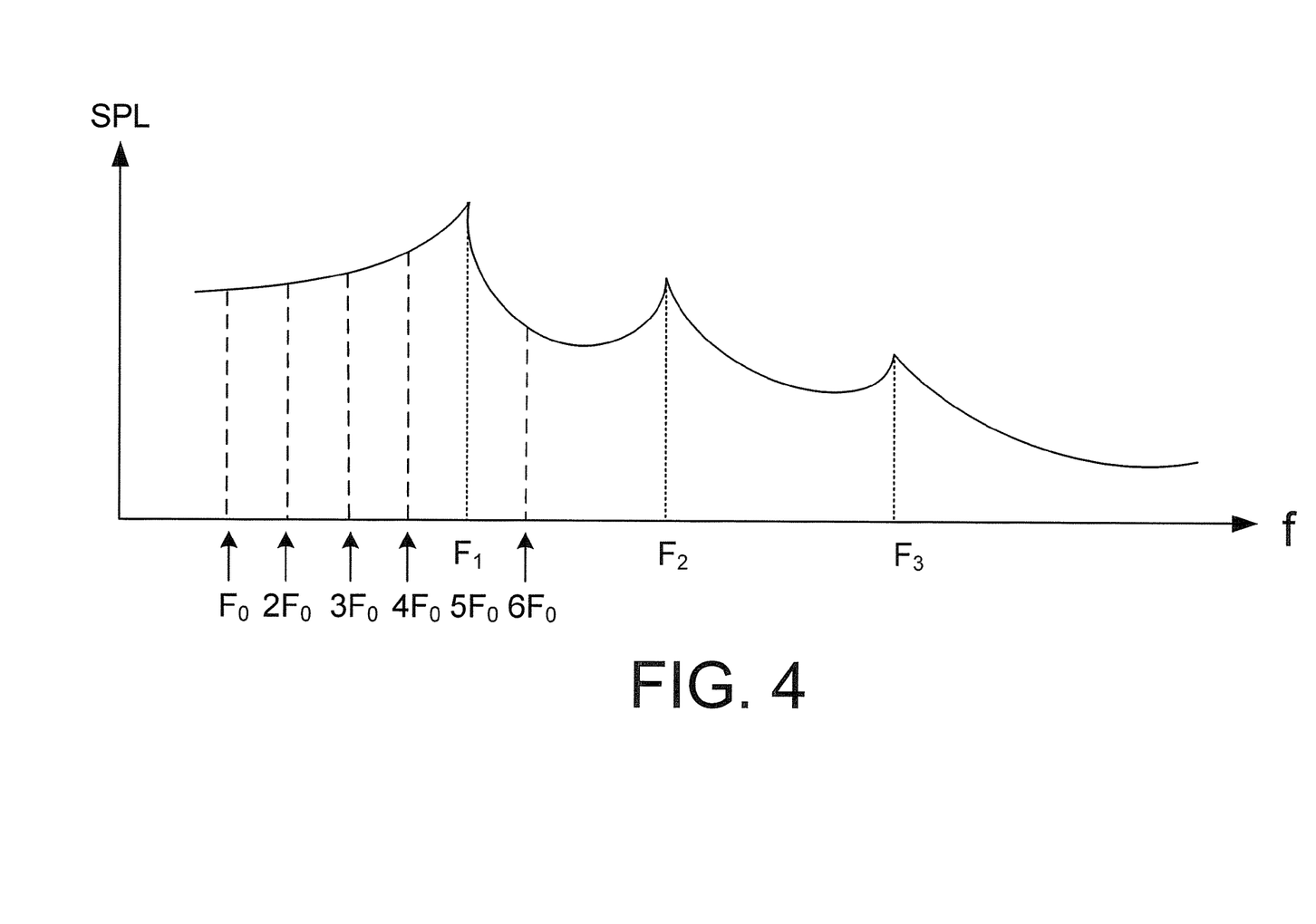

FIG. 4 schematically shows an example of a frequency spectrum of a vowel spoken by a particular person with particular vocal folds (decisive for fundamental frequency $F_0$) and vocal tract (decisive for formant frequencies $F_1$, $F_2$, $F_3$). The fundamental frequency $F_0$ is the lowest frequency in the harmonic series (higher frequencies in the series being represented by $n \cdot F_0$, where n=1, 2, 3, . . . ) generated by the vibration of the vocal folds of a given person when uttering a given sound (e.g. a specific word or vowel). The location of formant frequencies $F_1$, $F_2$, $F_3$, etc., the peaks in FIG. 4, are determined by the resonance volume of the vocal tract of the given person and define the distinguishing frequency components of human speech.

Examples of average fundamental and formant frequencies and average formant amplitudes of different vowels for male, female and child speakers were reported by Petersen & Barney (G. E. Peterson, H. L. Barney, Control Methods in a Study of the Vowels, The Journal of the Acoustical Society of America, vol. 24, no. 2, March 1952, pp. 175-184), cf. e.g. table II therein (and the corrections published by R. L. Watrous, Current status of Peterson-Barney vowel formant data, The Journal of the Acoustical Society of America, vol. 89, no. 5, 1991, pp. 2459-2460).

EXAMPLE 1

Vowel formant patterns for a female for different vowels:

| | Word | | |
|---|---|---|---|
| | beat | father | boot |
| | | Vowel | |
| | /i/ | /α/ | /u/ |
| $F_1$ | 310 Hz | 850 Hz | 370 Hz |
| $F_2$ | 2790 Hz | 1220 Hz | 950 Hz |

EXAMPLE 2

Vowel formant differences for the vowel /u/ as in "boot":

| Formant frequencies | For a male | For a female |
|---|---|---|
| $F_1$ | 300 Hz | 370 Hz |
| $F_2$ | 870 Hz | 950 Hz |
| $F_3$ | 2240 Hz | 2670 Hz |

FIG. 5 shows a partial block diagram of a hearing aid according to an embodiment of the disclosure illustrating the voice detector (VD) and frequency analyzer (FA) providing inputs to a decision unit (DEC), which—based on the inputs from the VD- and FA-units—decides which set of parameters to load into the digital signal processor (DSP) and when (if at all).

FIG. 5 illustrates the main parts of the forward path of a hearing aid according to an embodiment of the disclosure. The forward path comprises a microphone (MIC in FIG. 5) for receiving an acoustic input from the environment and converting it to an analogue electrical input signal, an AD-converter for converting the analogue electrical input signal to a digitized electrical input signal, a processing part DSP for adapting a digitized electrical input signal to the needs of a wearer of the hearing aid and providing a processed output signal, a DA-converter for converting the (digitized) processed output signal to an analogue output signal and a receiver (REC) for generating an acoustic output to the wearer of the hearing aid.

The functional parts of an embodiment of the present disclosure, the voice detector (VD), the frequency analyzer (FA) (e.g. including a time domain to frequency domain transforming unit, e.g. a fast Fourier transform (FFT) unit), the decision circuit (DEC) and the memory (MEM) can e.g. be an integral part of a digital integrated circuit, including the digital signal processor (DSP in FIG. 5) and possibly including an optional feedback cancellation system (cf. FIG. 1b, not shown in FIG. 5) and other digital circuitry of the hearing aid (as indicated by the dotted frame in FIG. 5). Alternatively, they may be implemented partially or fully separate there from, e.g. fully or partially in analogue form. The VD-, FA- and DEC-units may be implemented fully or partially as software algorithms. The DEC-unit decides if or when a new set of signal processor parameters (SP-Parameter) are to be forwarded to the digital signal processor (DSP) for use in the processing of the digitized signal from the microphone. The decision is i.a. based on the input voice from the voice detector (VD) whether or not a voice is present in the electric input signal from the microphone. The voice signal is updated at a predetermined VD-update frequency, related to the sampling frequency of the AD-converter. The decision of the DEC-unit is further based on the input $F_0$ from the frequency analyzer (FA) being a signal representative of a determined fundamental frequency of the voice (if a voice IS present). The $F_0$ signal is updated at a predetermined FA-update frequency, related to the sampling frequency of the AD-converter. Depending on the frequency range ($[f_{i1}, f_{i2}]$ in FIG. 5, cf. e.g. Table 1 above) in which the determined fundamental frequency is located, a relevant representative class $C_i$ ($C_3$=CHILD, $C_2$=FEMALE, $C_1$=MALE in FIG. 5) is determined and a corresponding parameter set ($P_{i1}, P_{i2}, \ldots$) and time delay ($TD_i$) identified. If the identified parameter set is different from the last loaded parameter set (i.e., here, if the Class is different), the identified parameter set ($P_{i1}, P_{i2}, \ldots$) is forwarded to the DSP after a corresponding time delay ($TD_i$). One or more of the time delays ($TD_i$) can optionally be set to zero (meaning that the change of parameter sets is intended to be performed as fast as possible). $TD_i$ may be represented be one or more values depending on the previous class, e.g. for $C_3$=CHILD, $TD_1$ may consist of one value TD(x->CHILD) independent of the previous class (x) or consist of values TD(MALE->CHILD) and TD(FEMALE->CHILD) specific for the transition from a MALE and FEMALE voice to a CHILD voice, respectively.

In an embodiment, the hearing aid is capable of being body worn. In an embodiment, the input transducer and the output transducer are located in the same physical body. In an embodiment, the hearing aid comprises at least two physically separate bodies which are capable of being in communication with each other by wired or wireless transmission (be it acoustic, ultrasonic, electrical of optical). In an embodiment, the input transducer is located in a first body and the output transducer is located in a second body. The term 'two physically separate bodies' is in the present context taken to mean two bodies that have separate physical housings, possibly not mechanically connected or alternatively only connected by one or more guides for acoustical, electrical or optical propagation of signals.

Voice detectors are known in the art and can be implemented in many ways. Examples of voice detector circuits based on analogue and digitized input signals are described in U.S. Pat. No. 5,457,769 and US 2002/0147580, respectively. The detection of a fundamental frequency or formant frequencies (cf. FIG. 4) can be performed in many different ways based on the analogue or digitized electrical microphone signal. Examples of pitch detectors for detecting a fundamental frequency of a voice signal are e.g. described in U.S. Pat. No. 4,161,625 and EP 0 821 345.

The requirements to the accuracy of the determination of the fundamental frequency are relatively relaxed. In an embodiment, the accuracy is better than +/−20%, such as better than +/−10%, such as better than +/−5%, such as better than +/−20%, such as better than 1%. In an embodiment, the accuracy is better than +/−20 Hz, such as better than +/−10 Hz, such as better than +/−5 Hz, such as better than +/−2 Hz.

EXAMPLE 3

A procedure for automatically adapting a hearing aid program to a particular type of voice is outlined in the following:
1. Detect whether or not a voice is present. If no voice is present, load a predefined silence program (or do nothing). If a voice is present:
2. Detect a fundamental frequency $F_0$ or a $1^{st}$ formant frequency $F_1$ of the voice or voices present.
3. In case that more than one voice is present, determine the dominant voice, e.g. by determining the voice having the largest sound pressure level of the fundamental frequency $F_0$ (or formant frequencies $F_i$).
4. Select or determine a gain profile (or a set of parameters) from a predefined set of gain profiles (or sets of parameters) according to the detected fundamental frequency $F_0$ or a $1^{st}$ formant frequency $F_1$ of the dominant voice.
5. Check if the determined gain profile (or set of parameters) is different from the currently used.
6. If yes, load the determined gain profile (or set of parameters) after a predetermined time delay TD (the time delay depending on the detected fundamental frequency $F_0$ or a $1^{st}$ formant frequency $F_1$ of the dominant voice). If no, continue with the existing setup.

In an embodiment, the procedure is repeated according to a predefined scheme, e.g. at regular intervals, e.g. faster than every 100 s, such as faster than every 30 s, such as faster than every 10 s, such as faster than every 1 s. In an embodiment, the procedure is continuously repeated ('continuously' being understood with a view to the smallest digital time step (1/sampling rate)).

In an embodiment, the corresponding sets of gain profiles (or parameter sets) and fundamental or formant frequencies are grouped in a number of representative groups, e.g. three representative groups, here MALE, FEMALE, CHILD (cf. FIG. 5).

In an embodiment, the time delay TD between detection and use of a given gain profile is smallest for a gain profile corresponding to the CHILD group and largest for a gain profile corresponding to the MALE group (and intermediate for a gain profile corresponding to the FEMALE group). Examples of possible time delays are TD(x->CHILD)= 0 s–2 s, e.g. 1 s, TD(x->FEMALE)=1 s–5 s, e.g. 2 s, TD(x->MALE)=1 s–10 s, e.g. 3 s, where e.g. TD(x->CHILD) indicates the time delay between detection of a CHILD voice (instead of another voice from representative groups, here FEMALE or MALE, or no voices at all) and loading of the parameters stored for listening to a CHILD voice. The delays corresponding to a transition from a FEMALE to a CHILD and from a MALE to a CHILD can e.g. be different. In a particular embodiment, TD(MALE->CHILD) is adapted to be smaller than TD(FEMALE->CHILD). In an embodiment, TD(MALE->CHILD) is adapted to be as small as possible.

Parameters of a given representative group (MALE, FEMALE or CHILD) may not necessarily be predefined for a given group but can be determined dependent upon the actual fundamental ($F_0$) and/or formant frequency ($F_i$, i=1, 2, ...) and/or sound pressure levels of this or these (and possibly some other parameter characteristic of the voice groups in question) detected according to an algorithm (or several different algorithms, e.g. one for each parameter), e.g. ALG($F_0$), or to an algorithm that is characteristic for the group in question (e.g. $ALG_{CHILD}(F_0)$, $ALG_{FEMALE}(F_0)$, $ALG_{MALE}(F_0)$).

An algorithm for determining a given parameter dependent upon a fundamental frequency can e.g. simply be a mathematical expression $f(F_0)$, e.g. parameter $P_{CHILD,1} = a_{CHILD,1} \cdot \log(F_0/F_{CHILD,ref})$, where $a_{CHILD,1}$ and $F_{CHILD,ref}$ are constants for the group (here CHILD) and parameter (here parameter 1) in question. Alternatively, an algorithm can be interpreted as a step-by-step problem-solving procedure, e.g. a recursive computational procedure, for determining one or more parameters in a finite number of steps.

Further, different sets of parameters for a given representative group, e.g. CHILD, may be stored for different programs, each program e.g. being adapted for a particular listening situation (face to face (one-to-one) or party or one-to-many, etc.). With reference to FIG. 5, the parameter set shown for each representative group would be for a specific program among a number of different programs p1, p2, p3, ... In such case a parameter set for a specific program p1 for a CHILD voice would be denoted $P_{CHILD,p1,1}$, $P_{CHILD,p1,2}$, $P_{CHILD,p1,3}$, ..., etc.

Further, the parameters shown in FIG. 5 (stored in a rapidly accessible memory (MEM)) may only be the ones that depend on the fundamental frequency, whereas other parameters of the corresponding programs are only stored in a more slowly accessible memory (e.g. a non-volatile memory).

In an embodiment, the gain profile of at least one representative group (e.g. CHILD) is optimized for that particular group (e.g. as represented by a predefined subset of parameters of a specific HA-program). In an embodiment, the gain profile for each representative group (e.g. CHILD, FEMALE, MALE) is optimized for each group.

In an embodiment, the gain profile optimized for the voice of a CHILD is optimized in that gain in the 'relatively higher frequency range' is enhanced compared to a MALE gain profile. In an embodiment, the CHILD gain is enhanced by from 1 dB to 20 dB in the range compared to a MALE gain profile. In an embodiment, the gain profile of the CHILD is enhanced by from 1 dB to 10 dB in the range compared to a FEMALE gain profile. In an embodiment, the gain profile optimized for the voice of a FEMALE is optimized in that gain in the 'relatively higher frequency range' is enhanced compared to a MALE gain profile. In an embodiment, the FEMALE gain is enhanced by from 1 dB to 10 dB in the range compared to a MALE gain profile. In an embodiment, the relatively higher frequency range comprises frequencies larger than 1 kHz, such as larger than 1.5 kHz, such as larger than 2 kHz, such as larger than 2.5 kHz, such as larger than 4 kHz. In an embodiment, the enhancement in the relatively higher frequency region is frequency dependent.

Other parameters/functionality that might be customized to a particular listener (representative group) are e.g. compression, directionality, maximum output power, noise reduction.

If a child's voice is detected, one or more of the following parameters can advantageously be specifically adapted:
Compression—more linear for all input levels (child profile: less compression)
Directionality—provide the most directional response (child profile: maximum directionality)
Maximum power output (MPO)—reduce in large groups, otherwise leave alone (child profile: if more than one voice is present, reduce maximum power output compared to a child-alone-situation)
Noise reduction (NR)—decrease if low frequency speech information is weak, increase if voices are detected in high noise situations If a female voice having a high fundamental frequency or which is relatively weak is detected, processing parameters adapted to be similar to those used for a child's voice should preferably be applied.

Figure 6A:
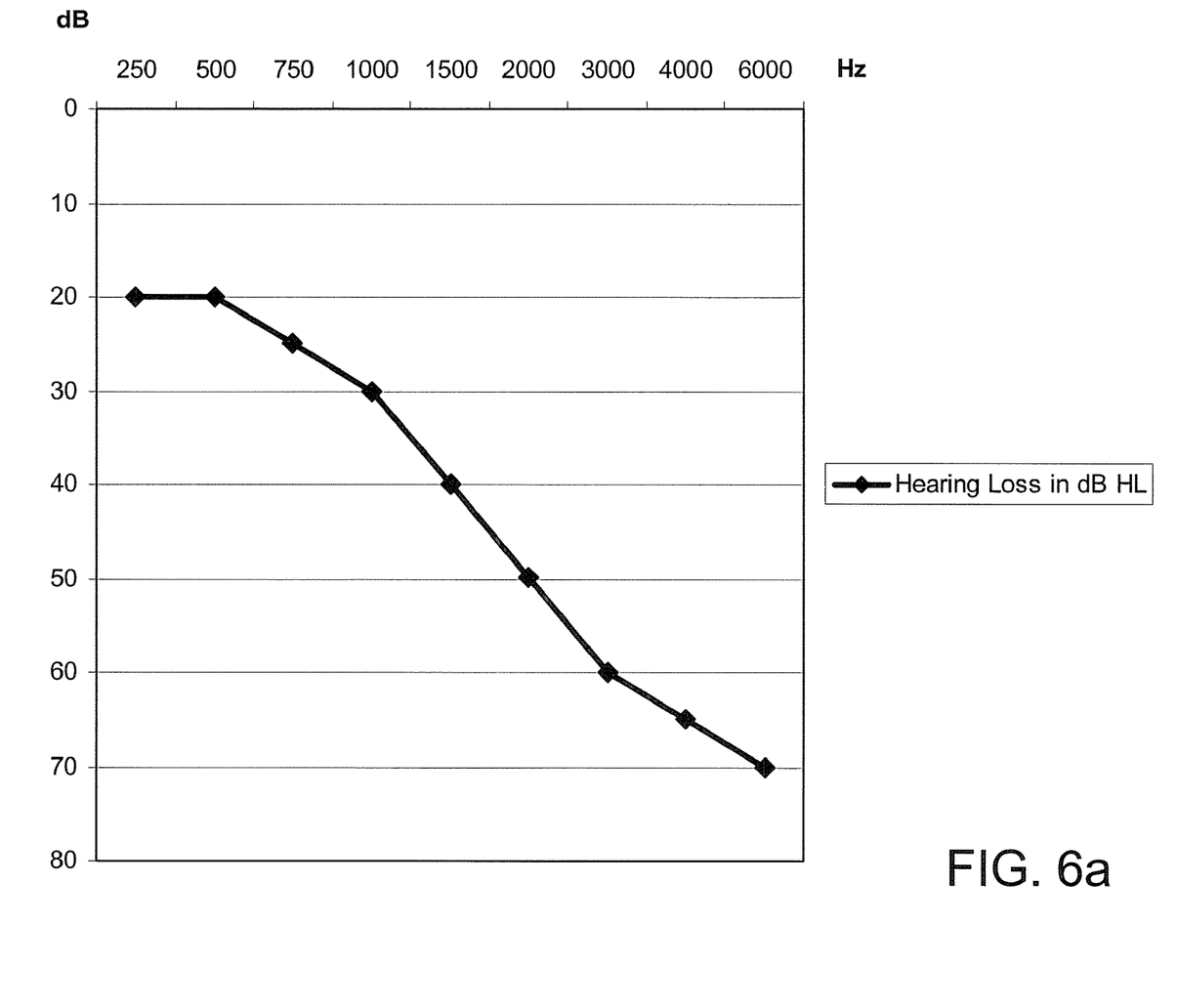
Figure 6B:
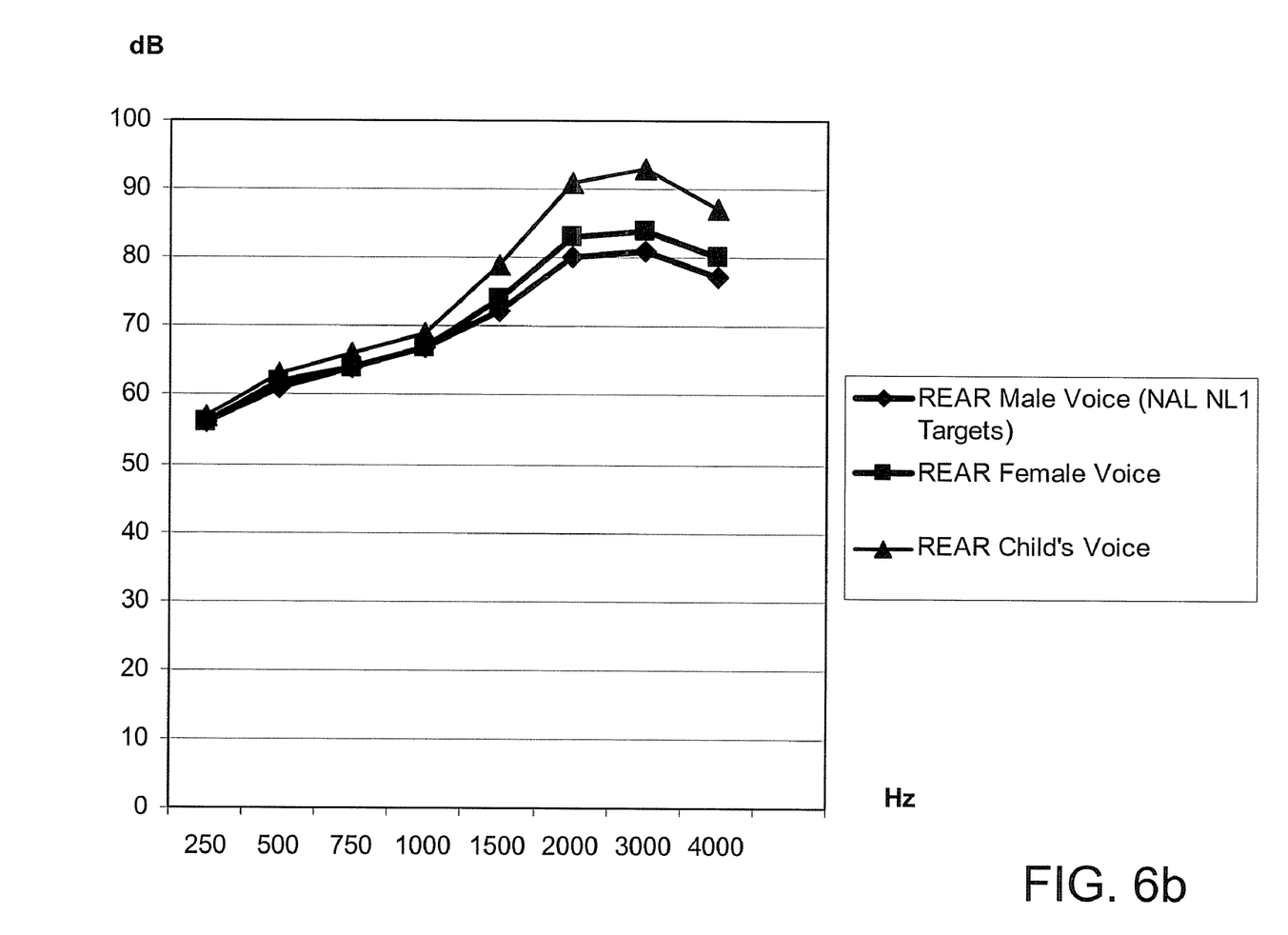

FIG. 6a shows an example of a hearing loss profile for a person (in dB HL vs. frequency 0-6000 Hz). The hearing loss increases with increasing frequency, reaching 70 dB around 6000 Hz. FIG. 5b illustrates corresponding gain profiles (in dB SPL vs. frequency 0-4000 Hz) optimized to a CHILD, a FEMALE and a MALE voice. It is clear at the gain is significantly higher (>10 dB at some frequencies) for a CHILD voice than for a MALE (or FEMALE) voice at relatively higher frequencies (here above 1500 Hz).

Some preferred embodiments have been shown in the foregoing, but it should be stressed that the disclosure is not limited to these, but may be embodied in other ways within the subject-matter defined in the following claims, and equivalents thereof.

References

US-2004/0190740 (Chalupper et al.) Sep. 30, 2004
U.S. Pat. No. 6,453,284 (TEXAS TECH UNIVERSITY) Sep. 17, 2002
EP-1 530 403 (PHONAK) May 11, 2005
US 2006/0179018 (BERNAFON) Aug. 10, 2006
G. E. Peterson, H. L. Barney, Control Methods in a Study of the Vowels, The Journal of the Acoustical Society of America, vol. 24, no. 2, March 1952, pp. 175-185
R. L. Watrous, Current status of Peterson-Barney vowel formant data, The Journal of the Acoustical Society of America, vol. 89, no. 5, 1991, pp. 2459-2460
W. A. Yost, D. W. Nielsen, Fundamentals of Hearing, Holt, Reinhart, & Winston, New York, N.Y., 1985.
A. M. Noll, Short-Time Spectrum and "Cepstrum" Techniques for Vocal-Pitch Detection, The Journal of the Acoustical Society of America, Volume 36, Number 2, February 1964.
A. M. Noll, Cepstrum Pitch Determination, The Journal of the Acoustical Society of America, Volume 41, Number 2, 1967.
U.S. Pat. No. 5,457,769 (EARMARK) Oct. 10, 1995
US 2002/0147580 (LM ERICSSON) Oct. 10, 2002
U.S. Pat. No. 4,161,625 (Katterfeldt, Mangold) Jul. 17, 1979
EP 0 821 345 (FRANCE TELECOM) Jan. 28, 1998

The invention claimed is:

1. A hearing aid comprising
a microphone for converting an ambient sound signal to an electric sound signal,
a voice detector adapted to determine if a voice is present in said electric sound signal,
a frequency analyzer to determine a fundamental frequency of a voice present in said electric sound signal,
a signal processor adapted to process said electric sound signal, or an electric signal derived from it, dependent upon adjustable processing parameters,
a memory comprising corresponding sets of processing parameters and fundamental voice frequencies, and
a decision unit to select and forward from the memory to the signal processor a set of processing parameters in accordance with a fundamental frequency determined by the frequency analyzer.

2. A hearing aid according to claim 1, wherein the decision unit provides a control signal adapted to select a set of processing parameters dependent upon the determined fundamental frequency.

3. A hearing aid according to claim 2, wherein the decision unit dependent upon the control signal is adapted to forward the selected set of processing parameters to the signal processor with a predetermined time delay TD.

4. A hearing aid according to claim 3, wherein the decision unit is adapted to provide that the time delay TD is dependent on the detected fundamental frequency F0.

5. A hearing aid according to claim 1, wherein the decision unit is adapted to provide that a predefined set of default parameters are loaded after a predetermined time delay in case no voice is present.

6. A hearing aid according to claim 1, wherein the voice detector is adapted to operate with a predefined VD-update frequency.

7. A hearing aid according to claim 1, wherein the frequency analyzer is adapted to operate with a predefined FA-update frequency.

8. A hearing aid according to claim 1, wherein the voice detector is adapted to determine a dominant voice among a multitude of voices.

9. A hearing aid according to claim 8, wherein the dominant voice is determined on the basis of average sound level (in a predefined frequency range).

10. A hearing aid according to claim 8, wherein the dominant voice is a child's voice and the system is automatically switched into full directional mode, with more gain applied in the higher frequencies for soft to medium input levels, noise reduction is increased.

11. A hearing aid according to claim 1, wherein the corresponding sets of processing parameters and fundamental voice frequencies include sets of processing parameters corresponding to predefined average fundamental frequencies for male, female and child voices.

12. A hearing aid according to claim 11, wherein said average male fundamental frequency is defined in the range from 85 Hz to 165 Hz.

13. A hearing aid according to claim 11, wherein said average female fundamental frequency is defined in the range from 165 Hz to 240 Hz.

14. A hearing aid according to claim 11, wherein said average child fundamental frequency is defined in the range from 240 Hz to 540 Hz.

15. A method of adapting a hearing aid to a voice in an acoustical environment, comprising
  a) converting an acoustical sound signal into an electrical sound signal;
  b) determining whether a voice is present in said electric sound signal;
  c) determining the fundamental frequency of the electrical sound signal, if a voice signal is present;
  d) classifying the voice based on the determined fundamental frequency and a predefined set of fundamental voice frequencies;
  e) selecting a set of parameters for processing the electrical sound signal based on the determined voice class and predetermined corresponding sets of processing parameters and voice classes; and
  f) forwarding the selected set of processing parameters to a signal processor for processing the electrical sound signal, or a signal derived from it, and generating a processed signal.

16. A method according to claim 15, wherein the corresponding sets of processing parameters and fundamental voice frequencies defining different voice classes include sets of processing parameters corresponding to predefined ranges of average fundamental frequencies for male, female and child voices.

17. A method according to claim 16, wherein said average male fundamental frequency is defined in the range from 85 Hz to 155 Hz.

18. A method according to claim 16, wherein said average female fundamental frequency is defined in the range from 165 Hz to 255 Hz.

19. A method according to claim 16, wherein said average child fundamental frequency is defined in the range from 250 Hz to 540 Hz.

20. A method according to claim 15, comprising determining a dominant voice among a multitude of voices.

21. A method according to claim 20, wherein the dominant voice is determined as the voice having the largest average sound level at the ear of a user, as determined over a predetermined time.

22. A method according to claim 20, wherein the dominant voice is classified as a child's voice and the corresponding set of processing parameters comprise at least one parameter for automatically switching the hearing aid into full directional mode, and/or for applying more gain at relatively higher frequencies for relatively soft to medium input levels, and/or for increasing noise reduction.

23. A method according to claim 15, wherein the processed signal is presented as an audible sound to a wearer of the hearing aid.

24. A method according to claim 15, wherein a total set of processing parameters for a specific hearing aid program comprises a total number Q of parameters, including a number $n*q$ of parameters that depend on the fundamental frequency of the input signal and a number $Q-n*q$ parameters that are independent thereof and wherein the $n*q$ parameters represent n subsets of q parameters each being optimized for a particular one of n possible voice classes, so that only $Q-(n-1)*q$ parameters are used in the signal processor at a given time for a specific hearing aid program.

25. A method according to claim 24, wherein a subset of q parameters out of the $n*q$ parameters can be exchanged in the total set of $Q-(n-1)*q$ parameters currently being processed by the signal processor without reloading all $Q-(n-1)*q$ parameters.

26. A non-transitory computer readable medium encoded with a software program for running on a digital signal processor of a hearing aid comprising a signal processor implementing the steps of the method according to claim 15 when executed on the digital signal processor.

27. A non-transitory computer readable medium having instructions stored thereon that, when executed, cause a signal processor of a hearing aid to perform the steps of the method according to claim 15,
  wherein the hearing aid comprises
    a microphone for converting an ambient sound signal to an electric sound signal,
    a voice detector adapted to determine if a voice is present in said electric sound signal,
    a frequency analyzer to determine a fundamental frequency of a voice present in said electric sound signal,
    a signal processor adapted to process said electric sound signal, or an electric signal derived from it, independent of adjustable processing parameters,
    a memory comprising corresponding sets of processing parameters and fundamental voice frequencies, and
    a decision unit to select and forward from the memory to the signal processor a set of processing parameters in accordance with a fundamental frequency determined by the frequency analyzer.

* * * * *